(12) United States Patent
Tanaka et al.

(10) Patent No.: US 8,546,025 B2
(45) Date of Patent: Oct. 1, 2013

(54) LITHIUM ION SECONDARY BATTERY

(75) Inventors: Masanao Tanaka, Ibaraki (JP); Tatsuo Nakamura, Ibaraki (JP); Hiroshi Ohnishi, Ibaraki (JP); Yuka Kondo, Ibaraki (JP); Koji Kimura, Ibaraki (JP); Te Hyon Cho, Osaka (JP); Tetsuo Sakai, Osaka (JP)

(73) Assignees: Japan Vilene Company, Ltd., Tokyo (JP); National Institute of Advanced Industrial Science and Technology, Tokyo (JP)

( * ) Notice: Subject to any disclaimer, the term of this patent is extended or adjusted under 35 U.S.C. 154(b) by 462 days.

(21) Appl. No.: 12/674,543

(22) PCT Filed: Aug. 21, 2008

(86) PCT No.: PCT/JP2008/064944
§ 371 (c)(1),
(2), (4) Date: Feb. 22, 2010

(87) PCT Pub. No.: WO2009/025332
PCT Pub. Date: Feb. 26, 2009

(65) Prior Publication Data
US 2011/0262817 A1 Oct. 27, 2011

(30) Foreign Application Priority Data

Aug. 22, 2007 (JP) ................................. 2007-215915
Jan. 28, 2008 (JP) ................................. 2008-015869

(51) Int. Cl.
*H01M 10/00* (2006.01)
*H01M 10/056* (2010.01)
*H01M 10/0565* (2010.01)

(52) U.S. Cl.
USPC ............ 429/341; 429/254; 429/326; 429/245

(58) Field of Classification Search
USPC ................. 429/405, 479, 477, 484, 492, 341, 429/255, 254
See application file for complete search history.

(56) References Cited

U.S. PATENT DOCUMENTS

| | | | |
|---|---|---|---|
| 2002/0009649 A1 | 1/2002 | Sato et al. | 429/306 |
| 2004/0146786 A1* | 7/2004 | Sato et al. | 429/326 |
| 2006/0154140 A1 | 7/2006 | Yamamoto et al. | 429/142 |
| 2007/0264568 A1* | 11/2007 | Ryu et al. | 429/213 |
| 2008/0090145 A1* | 4/2008 | Hiwara et al. | 429/188 |

FOREIGN PATENT DOCUMENTS

| | | | |
|---|---|---|---|
| EP | 1 164 654 | | 12/2001 |
| EP | 1855333 | * | 11/2007 |
| JP | 2002-190291 | | 7/2002 |
| JP | 2002-203604 | | 7/2002 |
| JP | 2004-363048 | | 12/2004 |
| JP | 2005-50808 | | 2/2005 |
| JP | 2007-294433 A | | 8/2007 |
| JP | 2008-192411 A | | 8/2008 |
| JP | EP 1855333 | * | 4/2010 |
| WO | 99/31750 | | 6/1999 |
| WO | 2004/038833 | | 5/2004 |
| WO | WO 2006075392 A1 | * | 7/2006 |
| WO | WO 2007083896 A1 | * | 7/2007 |

OTHER PUBLICATIONS

Arora, Pankaj, et al. "Battery Separators"; *Chem. Rev.*; 2004; vol. 104; pp. 4419, 4422, 4423, 4427-4429, 4454.

* cited by examiner

*Primary Examiner* — Basia Ridley
*Assistant Examiner* — Caitlin Wilmot
(74) *Attorney, Agent, or Firm* — Heslin Rothenberg Farley & Mesiti P.C.

(57) ABSTRACT

Disclosed is a lithium ion secondary battery, in which comprises a vinyl alcohol polymer or a derivative thereof in an amount of 0.3 mg or more per 1 mAh of battery capacity in terms of a vinyl alcohol unit moiety content. The lithium ion secondary battery can decrease the battery voltage under high-temperature conditions and cannot be recharged after being exposed to high-temperature conditions.

3 Claims, No Drawings

LITHIUM ION SECONDARY BATTERY

CROSS REFERENCE TO RELATED APPLICATIONS

This application is a 371 filing of PCT Application No. PCT/JP2008/064944 filed Aug. 21, 2008 and published in Japanese as WO 2009/025332 on Feb. 26, 2009, which claims the priority of Japanese Application No. 2007-215915 filed Aug. 22, 2007, and Japanese Application No. 2008-015869 filed Jan. 28, 2008. These disclosures and all other patents, published applications and other references cited herein are hereby incorporated by reference in their entirety.

TECHNICAL FIELD

The present invention relates to a lithium ion secondary battery.

BACKGROUND ART

With the recent advances in electronic technology, small portable electronic devices such as camera-integrated VTRs, mobile phone, and laptop computers have been developed, and the development of a secondary battery with small size, light weight, and high energy density is strongly desired as a portable power supply for the devices.

As such a secondary battery to meet this desire, non-aqueous electrolyte secondary batteries which can theoretically generate a high voltage and have high energy density, using a light metal such as lithium, sodium, or aluminum as a negative electrode active material, are expected. Among the non-aqueous electrolyte secondary batteries, a lithium ion secondary battery in which charge and discharge of lithium ions is carried out via the non-aqueous electrolyte is actively researched and developed, because it is expected to achieve a high power and high energy density in comparison with aqueous electrolyte secondary batteries such as the nickel-cadmium battery and the lead-acid battery.

Because the lithium ion secondary battery has a high internal energy, a high degree of safety is required in an abnormal event such as an internal short-circuit or an external short-circuit. For the reason, a polyolefin microporous membrane is used as the separator for safety measures, because it is thought that the polyolefin microporous membrane has a shutdown effect in which the conversion into a nonporous membrane caused by abnormal heating shuts down the current. Even if such safety measures are employed, there is still a possibility that abnormal heating does not stop and causes the shrinkage or melting of the polyolefin microporous membrane, and as a result, a fire of the battery occurs by an internal short-circuit caused by the contact between the electrodes.

In order to increase thermal safety of a lithium ion secondary battery by increasing heat resistance of a separator, it has been proposed that an integration of the polyolefin microporous membrane and a heat-resistant porous material. For example, "a separator for a lithium ion secondary battery characterized by comprising a polyolefin porous membrane and a polyester resin porous membrane" (patent reference 1) and "a separator characterized in that a heat-resistant barrier film is bonded with a liquid holding film and the puncture strength is 400 gf or more" (patent reference 2) were proposed. When these separators are used, a short-circuit caused by shrinkage or melting does not occur, but the battery reaction progresses further, and there is a risk of thermal runaway. In addition, when the voltage is decreased, the battery can be recharged, and there is a risk of runaway of the battery.

[patent reference 1] Japanese Unexamined Patent Publication (Kokai) No. 2002-190291
[patent reference 2] Japanese Unexamined Patent Publication (Kokai) No. 2004-363048

DISCLOSURE OF THE INVENTION

Problems to be Solved by the Invention

An object of the present invention is to provide a lithium ion secondary battery which can decrease the battery voltage under high-temperature conditions, and cannot be recharged after being exposed to high-temperature conditions.

Means for Solving the Problems

The problem can be solved by a lithium ion secondary battery of the present invention, characterized in that a polymer comprising a vinyl alcohol unit, or a derivative of the polymer (hereinafter referred to as the vinyl alcohol polymer) is arranged inside the battery in an amount of 0.3 mg or more per 1 mAh of battery capacity in terms of a vinyl alcohol unit moiety content.

According to a preferred embodiment of the present invention, the vinyl alcohol polymer is polyvinyl alcohol, a vinyl alcohol copolymer (such as an ethylene-vinylalcohol copolymer or a propylene-vinylalcohol copolymer), or polyvinyl acetal (such as polyvinyl formal or polyvinyl butyral).

According to another preferred embodiment of the present invention, a separator comprising the vinyl alcohol polymer (more preferably polyvinyl alcohol, a vinyl alcohol copolymer, or polyvinyl acetal) in an amount of 0.3 mg or more per 1 mAh of battery capacity in terms of a vinyl alcohol unit moiety content is arranged inside the battery.

With respect to the term "vinyl alcohol unit moiety" as used herein, when the vinyl alcohol polymer is a polymer comprising a vinyl alcohol unit, the term means the vinyl alcohol unit moiety, and when the vinyl alcohol polymer is a derivative of a polymer comprising a vinyl alcohol unit (for example, polyvinyl acetal), the term means the vinyl alcohol unit moiety of the original polymer (for example, polyvinyl alcohol).

Effects of the Invention

The lithium ion secondary battery of the present invention can decrease the battery voltage, even under high-temperature conditions (for example, 120° C.) excessively higher than normal working temperatures. If a battery is exposed to such high-temperature conditions once, there is a probability that the electrolyte and/or active material deteriorate and decompose. The lithium ion secondary battery of the present invention cannot be recharged in this case, and thus, is superior in safety.

BEST MODE FOR CARRYING OUT THE INVENTION

The lithium ion secondary battery of the present invention may have the same construction as that of a conventional lithium ion secondary battery, except that a specific amount of a vinyl alcohol polymer (for example, polyvinyl alcohol, a vinyl alcohol copolymer, or polyvinyl acetal) is arranged inside the battery. For example, a lithium-containing metal compound paste carried on a current collector may be used as the positive electrode; a lithium metal, a lithium alloy, a carbon material containing carbon or graphite which can occlude and release lithium (carbon materials such as coke, natural graphite, or artificial graphite), or composite tin oxide carried on a current collector may be used as the negative electrode; and a non-aqueous electrolyte prepared by dissolving $LiPF_6$ in a mixed solvent of ethylene carbonate and diethyl carbonate may be used as the electrolyte. The cell structure of the lithium ion secondary battery is not particularly limited, and may be, for example, stack type, cylindrical, box-shaped, coin-shaped, or the like.

In the lithium ion secondary battery of the present invention, the vinyl alcohol polymer may be arranged inside the battery in any form, for example, as powder, fibers, a film, or a fiber sheet. The term "(something) is arranged inside the battery" as used herein means that (something) is arranged within the battery so that it can be brought into contact with the electrolyte, with the proviso that an embodiment in which the vinyl alcohol polymer is used as the negative electrode (for example, the vinyl alcohol polymer is added to an anode material paste which contains a negative electrode active material and a solvent and is carried on the negative electrode current collector.) is excluded from the present invention.

When the vinyl alcohol polymer is arranged inside the battery in the form of a separator, the lithium ion secondary battery may be prepared, for example, by impregnating the vinyl alcohol polymer into a fiber sheet which constitutes the separator, or by using a fiber sheet containing the vinyl alcohol polymer fibers as the separator.

With respect to the impregnation, a separator to which the vinyl alcohol polymer is added may be obtained, for example, by impregnating a fiber sheet into a solution prepared by dissolving the vinyl alcohol polymer in an appropriate solvent, removing the excess solution from the fiber sheet using rollers or the like, and drying the fiber sheet. As the solvent used to dissolve the vinyl alcohol polymer, for example, water may be used when polyvinyl alcohol is used. Similarly, for example, dimethylformamide for an ethylene-vinyl alcohol copolymer, and toluene or dimethylformamide for polyvinyl formal may be used.

With respect to the fiber sheet containing the vinyl alcohol polymer fibers, it is preferable to form the fiber sheet by electrospinning, because excellent insulating properties can be imparted. The fiber sheet containing the vinyl alcohol polymer fibers may be further impregnated with the same or different vinyl alcohol polymer. The fiber sheet containing the vinyl alcohol polymer may be reinforced with a reinforcement. Regardless of whether or not a fiber sheet used as the separator contains the vinyl alcohol polymer, the fiber sheet may be reinforced with a reinforcement containing the vinyl alcohol polymer.

When the vinyl alcohol polymer is arranged inside the battery as a separator, the battery voltage can be efficiently decreased without inhibition of the activity of an active material, because the separator is located between the electrodes. Further, the recharge of the battery can be easily disabled, and thus, the battery is superior in safety.

When the vinyl alcohol polymer is arranged inside the battery as a separator, the thickness of the separator is preferably 80 μm or less, more preferably 70 μm or less, still more preferably 60 μm or less, still more preferably 50 μm or less, most preferably 40 μm or less, to impart an excellent ion permeability and not to increase the internal resistance. The thickness of the separator is preferably 5 μm or more, more preferably 10 μm or more, to impart an excellent mechanical strength and excellent insulating properties.

When the vinyl alcohol polymer is arranged inside the battery in a form other than a separator, the vinyl alcohol polymer may be arranged in the form of powder, fibers, a film, a fiber sheet, or the like, for example, on the inner wall of the battery, near the top cover, or on the bottom of the battery case.

The vinyl alcohol polymer which may be used in the present invention is not particularly limited, so long as it is a polymer comprising a vinyl alcohol unit [—CH(OH)—CH$_2$—], or a derivative thereof. Examples of the vinyl alcohol polymer include polyvinyl alcohol (PVA), a vinyl alcohol copolymer, and polyvinyl acetal.

As the polyvinyl alcohol, polyvinyl alcohol having a degree of polymerization of, for example, 100 to 10,000, preferably 300 to 5,000, more preferably 500 to 3,000 may be used. With respect to the degree of saponification, polyvinyl alcohol having a degree of saponification of, for example, 60% to 98%, preferably 70% to 98%, more preferably 80% to 98% may be used.

When a vinyl alcohol copolymer is used as the vinyl alcohol polymer, the molar ratio of the vinyl alcohol unit contained in the vinyl alcohol copolymer is preferably 30% to 80%, more preferably 35% to 75%.

Among these vinyl alcohol polymers, polyvinyl alcohol or polyvinyl acetal is preferable, because the battery voltage can be decreased and the recharge disabled with a small amount thereof.

When polyvinyl alcohol is used as the vinyl alcohol polymer, the content of polyvinyl alcohol per 1 mAh of battery capacity in terms of a vinyl alcohol unit moiety content is 0.3 mg or more, preferably 0.5 mg or more, more preferably 0.6 mg or more, still more preferably 0.7 mg or more, still more preferably 0.8 mg or more, still more preferably 0.9 mg or more, most preferably 1.0 mg or more. The upper limit is not particularly limited, so long as it can be arranged inside the battery case, and it is, for example, 100 mg or less per 1 mAh of battery capacity.

When a vinyl alcohol polymer other than polyvinyl alcohol (for example, a vinyl alcohol copolymer) is used, the content of the vinyl alcohol unit moiety per 1 mAh of battery capacity is 0.3 mg or more, preferably 0.5 mg or more, more preferably 0.6 mg or more, still more preferably 0.7 mg or more, still more preferably 0.8 mg or more, still more preferably 0.9 mg or more, most preferably 1.0 mg or more. The upper limit is, for example, 100 mg or less per 1 mAh of battery capacity.

When a polymer derivative (for example, polyvinyl acetal) is used, the content of the vinyl alcohol unit moiety of its original polymer (for example, polyvinyl alcohol) per 1 mAh of battery capacity is 0.3 mg or more, preferably 0.5 mg or more, more preferably 0.6 mg or more, still more preferably 0.7 mg or more, still more preferably 0.8 mg or more, still more preferably 0.9 mg or more, most preferably 1.0 mg or more. The upper limit is, for example, 100 mg or less per 1 mAh of battery capacity.

EXAMPLES

The present invention will now be further illustrated by, but is by no means limited to, the following Examples.

Example 1

(1) Preparation of Positive Electrode

A cathode material paste was prepared using 87 parts by mass of lithium cobalt oxide ($LiCoO_2$) powder, 6 parts by mass of acetylene black, and 13 mass % of an N-methyl-pyrrolidone (NMP) solution of polyvinylidene fluoride (PVdF) [7 parts by mass of PVdF as its dry weight]. The resulting paste was applied on an aluminum foil having a thickness of 20 μm, and was dried and pressed to obtain a positive electrode having a thickness of 90 μm.

(2) Preparation of Negative Electrode

An anode material paste was prepared using 90 parts by mass of natural graphite powder as a negative electrode active material, and 13 mass % of an NMP solution of PVdF [10 parts by mass of PVdF as its dry weight]. The resulting paste was coated on a copper foil having a thickness of 15 μm, and was dried and pressed to obtain a negative electrode having a thickness of 70 μm.

(3) Preparation of Non-Aqueous Electrolyte

As the electrolyte, a non-aqueous electrolyte prepared by dissolving $LiPF_6$ in a mixed solvent of ethylene carbonate/diethyl carbonate (50:50) so that the concentration of $LiPF_6$ became 1 mol/L [$LiPF_6$-EC/DEC (50:50); manufactured by Kishida Chemical Co., Ltd.] was used.

(4) Preparation of Nonwoven Fabric Sheet for Separator

Sheath-core type composite fibers (fineness=0.8 dtex, fiber length=5 mm) having a core component of polypropylene and a sheath component of polyethylene were used to form a nonwoven fabric sheet having a mass per unit area of 10 g/m² by a wet-laid method. A slurry consisting of polypropylene fibers (fineness=0.02 dtex, fiber length=2 mm) was scooped up with the resulting nonwoven fabric sheet (scooped up fiber mass: 5 g/m²) to obtain a composite nonwoven fabric sheet. A roller calender was used to adjust the thickness of the resulting composite nonwoven fabric sheet to obtain a nonwoven fabric sheet (thickness=40 μm, mass per unit area=15 g/m²).

(5) Preparation of PVA-Impregnated Separator

The nonwoven fabric sheet (thickness=40 μm, mass per unit area=15 g/m²) obtained in Example 1(4) was impregnated with an aqueous solution prepared by dissolving 10 parts by weight of polyvinyl alcohol (PVA) powder (degree of saponification=98%, degree of polymerization=1000) in water. The PVA-impregnated sheet was pressed with rollers and dried to obtain a separator to which PVA was uniformly added (weight of PVA added=4.1 g/m², vinyl alcohol unit weight per battery capacity=0.82 mg/mAh, thickness=40 μm).

(6) Preparation of Battery

The positive electrode obtained in Example 1(1), the negative electrode obtained in Example 1(2), the non-aqueous electrolyte prepared in Example 1(3), and the separator obtained in Example 1(5) were used to prepare a lithium ion secondary battery (2032-type coin cell) of the present invention.

Example 2

The procedure described in Example 1(5) was repeated, except that the amount of PVA impregnated was changed, to obtain a separator to which PVA was added (weight of PVA added=2.5 g/m², vinyl alcohol unit weight per battery capacity=0.5 mg/mAh, thickness=40 μm). The procedure described in Example 1(6) was repeated, except that the resulting separator was used, to prepare a lithium ion secondary battery of the present invention.

Example 3

The procedure described in Example 1(5) was repeated, except that PVA powder having a different degree of polymerization (degree of saponification=98%, degree of polymerization=500) was used and that the amount of PVA impregnated was changed, to obtain a separator to which PVA was added (weight of PVA added=5.9 g/m², vinyl alcohol unit weight per battery capacity=1.2 mg/mAh, thickness=40 μm). The procedure described in Example 1(6) was repeated, except that the resulting separator was used, to prepare a lithium ion secondary battery of the present invention.

Example 4

The procedure described in Example 1(5) was repeated, except that PVA powder having a different degree of saponification and a different degree of polymerization (degree of saponification=80%, degree of polymerization=500) was used and that the amount of PVA impregnated was changed, to obtain a separator to which PVA was added (weight of PVA added=6.1 g/m², vinyl alcohol unit weight per battery capacity=0.96 mg/mAh, thickness=40 μm). The procedure described in Example 1(6) was repeated, except that the resulting separator was used, to prepare a lithium ion secondary battery of the present invention.

Example 5

The procedure described in Example 1(5) was repeated, except that PVA powder having a different degree of saponification (degree of saponification=80%, degree of polymerization=1000) was used and that the amount of PVA impregnated was changed, to obtain a separator to which PVA was added (weight of PVA added=5.5 g/m², vinyl alcohol unit weight per battery capacity=0.88 mg/mAh, thickness=40 μm). The procedure described in Example 1(6) was repeated, except that the resulting separator was used, to prepare a lithium ion secondary battery of the present invention.

Example 6

The procedure described in Example 1(5) was repeated, except that PVA powder having a different degree of saponification (degree of saponification=80%, degree of polymerization=1000) was used and that the amount of PVA impregnated was changed, to obtain a separator to which PVA was added (weight of PVA added=3.1 g/m², vinyl alcohol unit weight per battery capacity=0.5 mg/mAh, thickness=40 μm). The procedure described in Example 1(6) was repeated, except that the resulting separator was used, to prepare a lithium ion secondary battery of the present invention.

Example 7

The procedure described in Example 1(5) was repeated, except that PVA powder having a different degree of saponification (degree of saponification=80%, degree of polymerization=1000) was used and that the amount of PVA impregnated was changed, to obtain a separator to which PVA was added (weight of PVA added=2.5 g/m², vinyl alcohol unit weight per battery capacity=0.4 mg/mAh, thickness=40 μm). The procedure described in Example 1(6) was repeated, except that the resulting separator was used, to prepare a lithium ion secondary battery of the present invention.

Comparative Example 1

The procedure described in Example 1(6) was repeated, except that a microporous polypropylene membrane (Celgard 2400; manufactured by Celgard, LLC) was used as a separator instead of the PVA-impregnated separator obtained in Example 1(5), to prepare a lithium ion secondary battery for comparison.

Comparative Example 2

The procedure described in Example 1(6) was repeated, except that the nonwoven fabric sheet obtained in Example 1(4) (i.e., the nonwoven fabric sheet before the impregnation with PVA) was used as a separator instead of the PVA-impregnated separator obtained in Example 1(5), to prepare a lithium ion secondary battery for comparison.

Comparative Example 3

The procedure described in Example 1(5) was repeated, except that the amount of PVA impregnated was changed, to obtain a separator to which PVA was added (weight of PVA added=0.4 g/m$^2$, vinyl alcohol unit weight per battery capacity=0.08 mg/mAh, thickness=40 μm). The procedure described in Example 1(6) was repeated, except that the resulting separator was used, to prepare a lithium ion secondary battery for comparison.

Comparative Example 4

The procedure described in Example 1(5) was repeated, except that the amount of PVA impregnated was changed, to obtain a separator to which PVA was added (weight of PVA added=0.6 g/m$^2$, vinyl alcohol unit weight per battery capacity=0.12 mg/mAh, thickness=40 μm). The procedure described in Example 1(6) was repeated, except that the resulting separator was used, to prepare a lithium ion secondary battery for comparison.

Comparative Example 5

In addition of a use of the positive electrode obtained in Example 1(1), the negative electrode obtained in Example 1(2), the non-aqueous electrolyte prepared in Example 1(3), and a microporous polypropylene membrane (Celgard 2400; manufactured by Celgard, LLC) as a separator, a PVA film (degree of saponification=98%, degree of polymerization=1000) was arranged at a place which was exposed to the electrolyte except the separator (the bottom of the battery case), so that the vinyl alcohol unit weight per battery capacity became 0.10 mg/mAh, to prepare a lithium ion secondary battery (2032-type coin cell) for comparison.

Example 8

A mixture of 50% by weight of sheath-core type composite fibers (fineness=0.8 dtex, fiber length=5 mm) having a core component of polypropylene and a sheath component of polyethylene, 25% by weight of polypropylene fibers (fineness=0.02 dtex, fiber length=2 mm), and 25% by weight of PVA fibers (fineness=2.2 dtex, fiber length=5 mm, degree of saponification=80%, degree of polymerization=1000) was used to obtain a nonwoven fabric sheet (mass per unit area=20 g/m$^2$) by a wet-laid method. A roller calender was used to adjust the thickness of the resulting nonwoven fabric sheet to obtain a separator (thickness=45 μm, mass per unit area=20 g/m$^2$, weight of PVA added=5.0 g/m$^2$, vinyl alcohol unit weight per battery capacity=0.80 mg/mAh). The procedure described in Example 1(6) was repeated, except that the resulting separator was used, to prepare a lithium ion secondary battery of the present invention.

Comparative Example 6

The procedure described in Comparative Example 5 was repeated, except that the amount of the PVA film was changed (the PVA film was arranged so that the vinyl alcohol unit weight per battery capacity became 0.04 mg/mAh), to prepare a lithium ion secondary battery for comparison.

Comparative Example 7

The procedure described in Example 1(5) was repeated, except that polyethylene glycol (Wako Pure Chemical Industries, Ltd.; degree of polymerization=1000) was used instead of the PVA powder, to obtain a separator to which polyethylene glycol was added (weight of polyethylene glycol added=4.5 g/m$^2$, polyethylene glycol weight per battery capacity=0.9 mg/mAh, thickness=40 μm). The procedure described in Example 1(6) was repeated, except that the resulting separator was used, to prepare a lithium ion secondary battery for comparison.

Comparative Example 8

The procedure described in Example 1(5) was repeated, except that polyacrylic acid (Wako Pure Chemical Industries, Ltd.; degree of polymerization=2000) was used instead of the PVA powder, to obtain a separator to which polyacrylic acid was added (weight of polyacrylic acid added=4.9 g/m$^2$, polyacrylic acid weight per battery capacity=1.0 mg/mAh, thickness=40 μm). The procedure described in Example 1(6) was repeated, except that the resulting separator was used, to prepare a lithium ion secondary battery for comparison.

Example 9

A mixture of 50% by weight of sheath-core type composite fibers (fineness=0.8 dtex, fiber length=5 mm) having a core component of polypropylene and a sheath component of polyethylene, 25% by weight of polypropylene fibers (fineness=0.02 dtex, fiber length=2 mm), and 25% by weight of orange-type composite fibers (fineness=3 dtex, fiber length=5 mm) having an 16-dividable orange-type cross-sectional shape consisting of a component of polypropylene and a component of an ethylene-vinylalcohol copolymer (molar ratio of ethylene unit to vinyl alcohol unit=4:6) which alternately radiated from the fiber axis (ratio by weight of polypropylene component to ethylene-vinylalcohol copolymer component=1:1) was used to obtain a nonwoven fabric sheet (mass per unit area=20 g/m$^2$) by a wet-laid method. A roller calender was used to adjust the thickness of the resulting nonwoven fabric sheet to obtain a separator (thickness=45 μm, mass per unit area=20 g/m$^2$, weight of vinyl alcohol unit=1.5 g/m$^2$, vinyl alcohol unit weight per battery capacity=0.3 mg/mAh). The procedure described in Example 1(6) was repeated, except that the resulting separator was used, to prepare a lithium ion secondary battery of the present invention.

Comparative Example 9

The procedure described in Example 9 was repeated, except that a mixture of 55% by weight of sheath-core type composite fibers, 25% by weight of polypropylene fibers, and 20% by weight of orange-type composite fibers was used, to obtain a nonwoven fabric sheet (mass per unit area=20 g/m$^2$). A roller calender was used to adjust the thickness of the resulting nonwoven fabric sheet to obtain a separator (thickness=45 μm, mass per unit area=20 g/m$^2$, weight of vinyl alcohol unit=1.2 g/m$^2$, vinyl alcohol unit weight per battery capacity=0.24 mg/mAh). The procedure described in Example 1(6) was repeated, except that the resulting separator was used, to prepare a lithium ion secondary battery for comparison.

Example 10

The procedure described in Example 9 was repeated, except that a mixture of 50% by weight of sheath-core type composite fibers described in Example 9, 30% by weight of polypropylene fibers described in Example 9, and 20% by weight of vinylon fibers (fineness=2.2 dtex, fiber length=5 mm) was used, to obtain a nonwoven fabric sheet (mass per unit area=20 g/m$^2$). A roller calender was used to adjust the thickness of the resulting nonwoven fabric sheet to obtain a separator (thickness=45 μm, mass per unit area=20 g/m$^2$, weight of vinylon=4 g/m$^2$, original vinyl alcohol unit weight per battery capacity=0.8 mg/mAh). The procedure described in Example 1(6) was repeated, except that the resulting separator was used, to prepare a lithium ion secondary battery of the present invention.

Evaluation (1) Safety Test at High Temperature

The theoretical capacity of each 2032-type coin cell prepared above is 1.6 mAh. A charge-discharge cycle consisting of a charging at a constant current and a constant voltage (0.2 C, 4.2 V) for 6 hours and a discharging at a constant current (0.2 C, 3 V cutoff) was carried out for 5 cycles, to confirm that each battery worked normally and that the desired battery capacity could be obtained, and then, the following safety test at high temperature was carried out.

The safety test at high temperature was carried out using fully-charged batteries, which were charged under a constant current and a constant voltage (0.2 C, 4.2 V) for 6 hours, by allowing the batteries to stand in a hot-air oven at 120° C., and measuring an open-circuit voltage (OCV) of each battery. The result is shown in Table 1.

If a lithium ion battery is exposed to high-temperature conditions for many hours while maintaining a high voltage, the degradation of the electrolyte and/or electrode active material and associated secondary reactions result in a self-heating reaction, which often causes a fire or smoke of the battery. For the reason, in this safety test, we defined a separator which can decrease voltage of a fully charged battery using the separator to 2 V or less within 60 minutes, as a safety separator. Furthermore, a separator which can decrease voltage of a fully charged battery using the separator to 2 V or less within 30 minutes is a separator having a higher safety.

(2) Recharge Test

Each battery after carrying out the safety test at the high temperature was discharged at 0.2 C, and charged at a constant current of 0.2 C for 6 hours to confirm whether or not each battery would work. The capacity after the recharge to the initial capacity (%) is shown in Table 1.

If a battery is exposed to high-temperature conditions once, there is a probability that the electrolyte and/or active material deteriorate and decompose, and therefore, it is preferable from the viewpoint of safety that the recharged battery does not work. In this recharge test, a separator in which the battery capacity of a battery charged under the above conditions is 10% or less with respect to the battery capacity before the safety test at high-temperature is defined as a safe separator. A separator having a value of 1% or less is a separator having a higher safety.

TABLE 1

|  | PVA | | | (d) | | | |
| --- | --- | --- | --- | --- | --- | --- | --- |
|  | (a) | (b) | (c) | (e) | (f) | (g) | (h) |
| Example 1 | 98% | 1000 | 0.82 | 1.3 | 1.2 | 1.1 | ≤1 |
| Example 2 | 98% | 1000 | 0.5 | 1.2 | 1.1 | 1.1 | 1.5 |
| Example 3 | 98% | 500 | 1.2 | 1.2 | 1.1 | 1.1 | ≤1 |
| Example 4 | 80% | 500 | 0.96 | 1.1 | 1.1 | 1.1 | ≤1 |
| Example 5 | 80% | 1000 | 0.88 | 1.2 | 1.1 | 1.1 | ≤1 |
| Example 6 | 80% | 1000 | 0.5 | 1.2 | 1.1 | 1.1 | 1.5 |
| Example 7 | 80% | 1000 | 0.4 | 2.2 | 1.1 | 1.1 | 1.5 |
| Comparative Example 1 | — | — | — | 4.1 | 4.0 | 3.9 | 75 |
| Comparative Example 2 | — | — | — | 4.1 | 4.0 | 3.9 | 65 |
| Comparative Example 3 | 98% | 1000 | 0.08 | 3.8 | 3.3 | 1.8 | 35 |
| Comparative Example 4 | 98% | 1000 | 0.12 | 3.6 | 1.2 | 1.1 | 2 |
| Comparative Example 5 | 98% | 1000 | 0.10 | 3.7 | 1.2 | 1.1 | 6 |
| Example 8 | 80% | 1000 | 0.80 | 1.3 | 1.1 | 1.1 | 2 |
| Comparative Example 6 | 98% | 1000 | 0.04 | 3.9 | 3.8 | 3.4 | 58 |
| Comparative Example 7 | — | — | 0.9 | 4.0 | 3.9 | 3.8 | 63 |
| Comparative Example 8 | — | — | 1.0 | 4.0 | 3.9 | 3.8 | 67 |
| Example 9 | — | — | 0.3 | 2.8 | 1.2 | 1.1 | 1.5 |
| Comparative Example 9 | — | — | 0.24 | 3.4 | 1.1 | 1.1 | 3 |
| Example 10 | — | — | 0.8 | 1.3 | 1.2 | 1.1 | ≤1 |

(a) Degree of saponification
(b) Degree of polymerization
(c) Weight of polymer added (mg/mAh)
(d) Open-circuit voltage (V)
(e) After 30 min.
(f) After 60 min.
(g) After 120 min.
(h) Percentage of recharge (%)

The results shown in Table 1 revealed the following:

(1) As shown from comparison of Examples with Comparative Examples, when the vinyl alcohol unit weight per battery capacity is 0.3 mg/mAh or more (in particular, comparison of Examples 1 and 2 with Comparative Examples 3 and 4, or comparison of Example 9 with Comparative Example 9), preferably 0.5 mg/mAh or more (in particular, comparison of Example 6 with Example 7), more preferably 0.8 mg/mAh or more (in particular, comparison of Example 1 with Example 2, or comparison of Example 5 with Example 6), the battery can decrease the battery voltage and cannot be recharged.

(2) As shown in Examples 1 to 10, to decrease the battery voltage and to disable the recharge of the battery, vinyl alcohol polymers may be impregnated into a separator, or may be in the form of fibers, that is to say, the state thereof is not particularly limited, so long as vinyl alcohol polymers are arranged inside the battery.

(3) As shown in Examples and Comparative Examples 7 and 8, when a polymer has vinyl alcohol units, the polymer can decrease the battery voltage and disable the recharge of the battery.

Although the present invention has been described with reference to specific embodiments, various changes and modifications obvious to those skilled in the art are possible without departing from the scope of the appended claims.

The invention claimed is:

1. A lithium ion secondary battery, having a separator arranged inside the battery, said separator comprising the polyvinyl alcohol having a degree of polymerization of 100 to 1,000, or a vinyl alcohol copolymer in an amount of 0.3 mg or more per 1 mAh of battery capacity in terms of a vinyl alcohol unit moiety content.

2. A lithium ion secondary battery, having a separator arranged inside the battery, said separator having a thickness of 50 μm or less and comprising polyvinyl acetal in a form of a fiber sheet in an amount of 0.3 mg or more per 1 mAh of battery capacity in terms of a vinyl alcohol unit moiety content.

3. The lithium ion secondary battery of claim 1, wherein the thickness of the separator is 50 μm or less.

* * * * *